Sept. 15, 1964 B. D. SIMMONS 3,149,286
PULSE COUNTER EMPLOYING PLURAL CIRCULATING DELAY-LINE STORES FOR STAGES AND COINCIDENT GATING TO EFFECT COUNTING
Filed Oct. 10, 1960
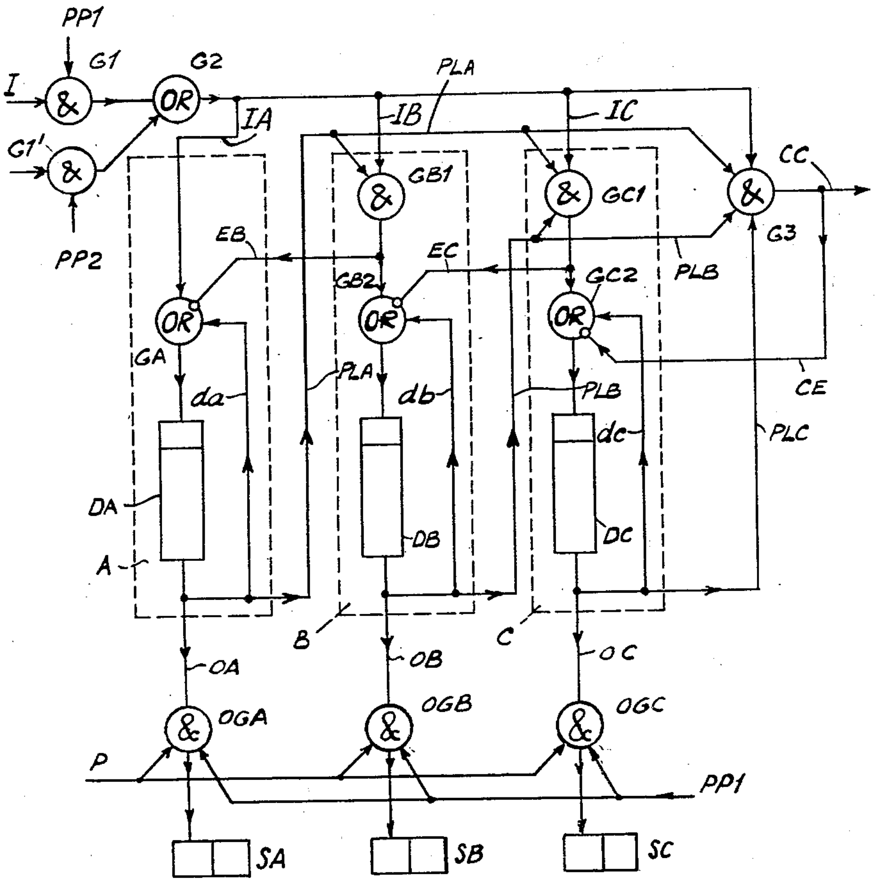
INVENTOR
BRIAN DESMOND SIMMONS
BY
Larson and Taylor

United States Patent Office 3,149,286
Patented Sept. 15, 1964

3,149,286

PULSE COUNTER EMPLOYING PLURAL CIRCULATING DELAY-LINE STORES FOR STAGES AND COINCIDENT GATING TO EFFECT COUNTING

Brian Desmond Simmons, Chislehurst, England, assignor to Associated Electrical Industries Limited, London, England, a British company Filed Oct. 10, 1960, Ser. No. 61,447
Claims priority, application Great Britain Oct. 16, 1959
5 Claims. (Cl. 328—50)

This invention relates to electric pulse counting circuits and is particularly concerned with counting pulses occurring at intervals which may be of variable length with respect to each other but are each an integral multiple of a basic interval. The counter is therefore applicable to the counting of pulses which occur in corresponding time periods in successive cycles of such time periods, there being either a single pulse or no pulse in each such period. In this application, the overall cycle period represents a basic time interval of which the interval between the pulses to be counted is an integral multiple. The time periods constituting each cycle may for instance relate to different channels of a time division multiplex system, the counter being required to count the number of pulses received in respect of a particular channel, or individually in respect of each of a number of channels. In the following, corresponding time periods from successive cycles will be referred to as relating to a particular channel, and each such time period will be called a channel period, in accordance with the terminology of time division multiplex systems, but it is to be understood that this mode of reference is used only to facilitate description and that the invention is not limited to counting pulses in time division multiplex systems. Each channel period in a channel cycle will relate to a different channel.

A known form of pulse counter suitable for counting channel pulses as above indicated comprises a number of stages each including a circulating delay line store the circulation time (access time) of which is such that an input pulse applied to it in a particular channel period re-appears at the input, after circulation, at a time coincident with the next channel period relating to the same channel. The pulses to be counted are received on a single input lead. The first pulse in a particular channel enters the first delay line store and on each appearance at its input primes the first of a chain of gating circuits which individually give access to the other stores. The second pulse in the same channel (occurring in the next channel cycle or in some subsequent channel cycle) passes through this primed first gate to the second store and also to an erase gate in the circulation path of the first store, so that the circulation of the first pulse in this latter store is stopped. The pulse circulating in the second store primes the second gate in the chain on each appearance at the store input. The next pulse in the same channel passes into the first store and is also applied to the first gate but cannot pass beyond it in the absence at this time of a coincident circulating pulse in the first store. Pulses are now circulating in the first and second stores in respect of the channel concerned. The next pulse of the same channel passes through the first and second gates (which are now primed by the circulating pulses) and enters the third store. In doing so it also erases the coincident pulses circulating in the first two stores, so that there is then a pulse of the relevant channel circulating only in the third store. Similar actions take place for subsequent pulses of this channel. In this manner the pulses circulating in the several stores for a particular channel at any time indicate, in binary code, the number of pulses recieved in that channel. This information can be abstracted and utilised in any desired manner.

A disadvantage of this known circuit is that as the pulse count increases, so the number of gates through which the pulses have to pass to reach the higher order stores also increases, with the result that the pulses are subject to an increasing delay. For a small number of pulses this may not be too serious, but where the number of pulses may be large the overall delay may be such that a pulse arriving at a higher order store would no longer be fully in time coincidence with its own channel period and may in fact be in another channel period, thereby losing its identity. An object of the present invention is to provide a pulse counter in which this disadvantage is avoided.

In the pulse counter of the present invention, which in its broadest aspect serves for counting in a particular code (e.g. decimal or binary or two-out-of-five) a sequence of pulses occurring at intervals that are each an integral multiple of a basic interval, each counter stage includes a circulating delay line store having a circulation time (access time) which is an integral multiple of the basic pulse interval and is chosen such that an input pulse applied to the store re-appears at the input at a time coincident with that at which the next pulse of the same sequence may occur: for instance the access time may be chosen such that an input pulse relating to a particular channel re-appears at the input in a subsequent channel period relating to the same channel, which subsequent channel period may be in the next or some subsequent channel cycle. Of these stores, at least those other than the first have individual input gating circuits each of which may have more than one gating stage and to all of which the input pulses to be counted are fed in parallel. From each store a priming connection on which a circulating pulse in the store will appear substantially at the time of its re-appearance at the store input is taken to the input gating circuit of each oher store which, according to the particular counting code, may be required to accept the next input pulse, and from the input gating circuit of at least those stores except the first an erase lead is taken to each other store which according to the counting code is required on such next input pulse to have an existing circulating pulse erased from it. For instance where counting is in binary code a priming connection may be taken to the input gating circuit of each of the succeeding stores, while from each of these gating circuits an erase lead is taken to the preceding store.

In order to give a fuller understanding of the nature of the invention and also to explain its mode of operation, reference will be made to the single figure of the accompanying drawing which illustrates in so-called logical form a binary counter embodying the invention. The counter is shown as having three stages but according to the maximum pulse count to be catered for may include a greater or lesser number of stages each based on the same general principles.

Referring to the drawing, each counter A, B, C . . . comprises a delay line DA, DB, DC . . . having a circulating path *da*, *db*, *dc* . . . between its output and input and also having respective input connections 1A, 1B, 1C . . . each of which includes an individual input gating circuit GA or GB1–GB2 or GC1–GC2 . . . as the case may be of which the gates GA, GB2, GC2 . . . are single coincident ("OR") gates included in the circulation path of the respective delay line stores. The drawing also shows a further gate G3 which is a "carry" gate and may for instance be an input gate corresponding to GB1, GC1 of a further counter stage similar to B and C, or a gate giving access to a further counter of a similar or non-similar nature.

Input pulses to be counted, applied to a common input connection I which may include gates G1 and G2 for a purpose to be described later, are fed in parallel to the gates GA, GB1 and GC1 in connections IA, IB and IC.

They are also fed to the carry gate G3. These gates, with the exception of GA, also have priming leads PLA, PLB, PLC . . . connected to them from the output of the delay line in each preceding stage: thus GB1 has a priming lead PLA from the output of DA, GC1 has priming leads PLA and PLB from both DA and DB, and G3 has priming leads PLA, PLB, PLC from DA, DB and DC. Each of these gates is a multiple-coincidence "AND" gate (symbolised by &) requiring to be primed on each of its priming leads in order for it to pass a pulse fed to it from the input lead I. An erase lead, EB, EC, goes from the output of each of the gates GB1, GC1 to the gate GA, GB2 in the preceding stage. An erase lead CE also goes from the output of G3 to gate GC2.

It will be assumed that the counter is to be employed in conjunction with a hundred-channel time division multiplex system having a cycle period of, for instance, 100 microseconds ($\mu$s.) and individual channel periods of 1 $\mu$s. each. Channel periods relating to the same channel therefore recur at intervals of 100 $\mu$s. The delay line stores DA, DB, DC are designed to have an access time (being the circulation time of a pulse therein) which is equal to or an integral multiple of the 100 $\mu$s. cycle period. Let it be assumed for the moment that the access time is 100 $\mu$s., that is, equal to the multiplex cycle period. Considering a particular channel and ignoring for the time being the gates G1 and G2, which may be considered as being permanently open, the first pulse appearing in that particular channel, namely in a channel period allocated to it, passes through GA into DA and circulates via *da* and GA. The circulating pulse appears at the output of DA at 100 $\mu$s. intervals after its initial application. Consequently it re-appears at GA, and also primes GB1 and GC1, at times coincident with each subsequent channel period of the channel in question. GB1 is fully primed at these times but not GC1, which requires also to be primed from DB. The second pulse in the channel concerned therefore passes through GB1 into DB and in doing so inhibits GA over EB, thereby erasing the original pulse in DA, *da*, GA. The next input pulse passes into DA. It is not passed by GC1 because although this gate is now primed from DB it is no longer primed from DA in the absence of a circulating pulse in the latter. After the receipt of this third pulse there is a pulse circulating for the relevant channel in both DA and DB. The next input pulse passes into DC via GC1, which is at this time coincidentally primed from DA and DB. The pulse passed by GC1 also inhibits GB2 thereby erasing the channel pulse in DB, *db*, GB2. Since GB1 was primed from DA coincidentally with the fourth pulse this pulse also passes through GB1 to inhibit GA and thereby erase the relevant pulse in DA, *da*, GA. Following the fourth pulse therefore a pulse is left circulating in DC, *dc*, GC2 but not in the preceding stores.

Similar actions take place in respect of subsequent pulses in such manner that at any time the number of pulses which has been received for the particular channel is indicated in binary code by the particular combination of stores which then have a pulse circulating in them for that channel. The maximum count, reached when a pulse is circulating in each of the stores, is seven for the three stage counter as shown. An eighth pulse in the same channel finds G3 primed on each of its priming leads PLA, PLB, PLC. Consequently G3 passes this eighth pulse to a carry lead CC and thence to another counter or counter stage as already mentioned. This carry pulse also inhibits GC2 to erase the channel pulse circulating in DC, *dc*, GC2. The eighth channel pulse also passes through GB1 and GC1 (coincidentally primed from DA and from DA and DB respectively) and thereby erases at GA and GB2 the relevant pulse circulating through DA and DB. The three counter stages are therefore cleared in respect of the particular channel and can go through a similar counting cycle in response to subsequent pulses in the same channel.

If desired a carry pulse may be taken after any required number of input pulses less than the maximum capacity of the counter, that is, the counter may be arranged to count to some number less than the maximum of which it is capable. For instance a three stage counter as shown may be required to count in fives, or a four stage counter may be required to count in tens. In such a circumstance the carry gate G3 would have connected to it only those of the priming connections PLA, PLB, PLC which will have pulses on them at the time of occurrence of the input pulse in response to which a carry pulse has to be produced. In order that, following this carry, the counter will be left clear, ready to start a new counting cycle for subsequent input pulses, the inhibiting erase lead from the carry gate may have to be taken not only to the input "OR" gate of the last delay line store but also to the input "OR" gates of certain others of the stores depending on the counting code and on the count at which the carry is to be produced. In general the erase lead from the carry gate has to be taken to the input "OR" gate of those stores in which a pulse is circulating in respect of the pulse sequence being counted, and has therefore to be erased, or for which the respective input "AND" gates are fully primed and the existing erase leads to their input "OR" gates come from stages in which the "AND" gates are not fully primed, so that in the absence of any other inhibition on the input "OR" gates the input pulse producing the carry would also pass into these stores and begin circulating therein. For example, if the counter illustrated is required to count in fives, giving a carry on each fifth input pulse of a sequence being counted, then only priming lead PLC would be taken to gate G3 (which would now be a coincidence-of-two gate) and the erase lead CE would be taken additionally at least to gate GA. This would be necessary because following the fourth count no pulse is circulating via delay line DA and gate GB1 is therefore not primed to pass the fifth pulse, which will therefore not inhibit itself, at gate GA via erase lead EB, from passing into delay line DA. Since no pulse is circulating via delay line DB and gate GB1 is not primed to pass the fifth input pulse, erase lead CE would not need to be taken to gate GB2 in the circumstances being considered.

The count stored in the counter for a particular channel can be abstracted by way of the output leads OA, OB, OC . . . from the several delay lines in conjunction with the carry lead CC.

It will be noticed that the gating requirements of GB1, GC1 and the corresponding gates in any subsequent counter stages are such that the coincidence number of these gates progressively increases: that is, GB1 is a coincidence-of-two gate, GC1 is a coincidence-of-three gate and so on. This may therefore impose a limit on the number of stages that are practicable: if the required counting capacity exceeds this limit the carry gate G3 could feed another counter which independently counts the "carry" pulses appearing on lead CC.

If it is sufficient for the information conveyed by the pulses in each channel to be presented at greater intervals than a single cycle period, it becomes possible for each channel to be shared on a time division basis so that for instance, successive channel periods relating to the same channel are allocated cyclically to separate but possibly related items of information. This sharing may be achieved under the control of time-staggered timing pulse trains in each of which the pulse repetition period is prime with respect to the channel cycle period. Consequently the pulses in any one of these pulse trains will coincide with the channel period of a particular channel in only each *n*th channel cycle where *n* is the repetition period of the timing pulses in a train; that is, there will be a unique coincidence of one of the timing pulses of a particular train with a particular channel once in each $n \times p$ channel period, $p$ being the number of channel periods per cycle and being 100 in the example assumed above. Where the cycle period is 100 μs. as above, $n$ may be for example 9 μs., 9 being prime with respect to 100.

In using the counter of the drawing in these circumstances, the input lead includes the coincidence gate G1 primed by a train (PP1) of the timing pulses. Consequently there is passed towards the counter proper only those pulses which, as regards any particular channel, occur coincidentally with a PP1 timing pulse. Delay lines DA, DB, DC . . . are now given a delay equal to $n$ times the channel cycle period (namely a delay of 900 μs. if $n=9$). As a result, the input pulses fed into DA circulate therein at relative time positions determined by the timing of the PP1 pulses. The counter now counts pulses occurring in corresponding channel periods only in every $n$th cycle but otherwise function in a similar manner to that already described. In intervening cycles similar pulse counting may be effected by feeding to the counter pulses passed by a gate (such as G1′ shown dotted) which is controlled by another (PP2) of the trains of timing pulses. In this case, the pulses from gates G1 and G1′ would be fed to the counter proper via a combining gate G2. In order to then segregate the outputs appearing on leads OA, OB, OC . . . or CC at different PP times, the outputs may be passed to respective gates primed respectively by the several PP pulse trains. For instance in order to abstract the count of pulses occurring coincidentally with the PP1 pulses in a particular channel, the output leads OA, OB, OC may go to a set of output gates OGA, OGB, OGC each having a first priming lead to which the PP1 pulses are applied and a second priming lead to which pulses (P), coinciding with successive channel periods of the particular channel, are applied when it is desired to abstract the count. Coincidence of a channel pulse (P) with a PP1 pulse opens the gates OGA, OGB, OGC to pass to staticisers SA, SB, SC the pulses which are circulating in the delay lines DA, DB, DC in the PP1 time position in the required channel. As a result, the staticisers SA, SB, SC which may each be constituted by a bistable two-state circuit, many forms of which are well known, become set to a combination of states representing in binary code the pulse count required.

The delay lines DA, DB, DC may take any known form, being for instance mercury or magnetostrictive delay lines. Many forms of "OR" and "AND" gates, and ways of inhibiting them if necessary, are also well known. It is therefore thought that the logical form of representation used in the single figure of the drawing constitutes a fully adequate disclosure of the invention without requiring specific circuit or other details for the delay lines and gates.

Whereas the illustrated embodiment of the invention counts the input pulses in a binary code, it is to be understood that the basic principles of the invention are equally applicable for counters counting in other codes.

What I claim is:

1. A multi-stage pulse counter for counting in a predetermined code a sequence of input pulses occurring at intervals that are each an integral multiple of a basic interval, said counter comprising:

a plurality of circulating delay line stores, one per stage, each having a circulation time which is such an integral multiple of said basic interval that an input pulse applied to the store will reappear at its input at a time coincident with that at which the next input pulse of the same sequence may occur;

individual input connections to the several delay line stores connected to receive the input pulses in parallel;

individual input gating circuits included in said input connections of at least those delay line stores other than the first;

priming connections for said input gating circuits, each store having such a priming connection extending from it to the input gating circuit of certain of the other stores which according to the counting code may be required to accept the next input pulse through such gating circuit, said priming connection extending from a position in the store at which a circulating pulse will appear substantially at the same time as it reappears at the store input;

and a plurality of erase leads including an erase lead extending from the input gating circuit of at least each store except the first to certain of the other stores required according to the counting code pulse to have an existing circulating pulse erased from it on such next input pulse.

2. A counter as claimed in claim 1 wherein each delay line store includes a circulation path from the output end of its delay line, the individual input gating circuit of each store includes an input OR gate to which said circulation path is also connected, and the input connection to at least each delay line store except the first also includes an input AND gate preceding the OR gate therein, said erase leads extending from the output sides of said AND gates of the pertinent stores and said priming connections extending from the output ends of the delay lines of the stores to the input AND gates of the relevant other stores.

3. A counter as claimed in claim 2 wherein the erase leads are connected as inhibiting connections to said input "OR" gates of the relevant stores.

4. A counter as claimed in claim 1 including a carry gate connected also to receive the input pulses and having such of the priming connections connected thereto as will have a pulse present thereon at the time of the occurrence of a particular input pulse in response to which a carry is to be produced, a further erase lead being taken from the carry gate to each and any delay line store which at the time of said particular input pulse will have a pulse circulating therein in respect of the sequence being counted or will have its input gating circuit fully primed with no erase lead thereof connected to a fully primed input gating circuit of another stage.

5. A counter as claimed in claim 1 adapted for counting a sequence of pulses occurring in periodically recurring channel periods allocated to a particular time channel and shared by a number of such pulse sequences on a time division basis determined by time staggered timing pulse trains in each of which the pulse repetition period is prime with respect to the recurrence period of said channel periods, wherein each of the circulating delay line stores has a circulation time equal to $n$ times the channel cycle period, $n$ being the repetition period of the timing pulses in each train thereof, and wherein in respect of said pulse sequence to a common input connection to the individual input connections of the several delay line stores includes a coincidence gate connected to be primed by the timing pulses of the train relating to that sequence.

References Cited in the file of this patent

FOREIGN PATENTS 1,162,582 France ---------------- May 22, 1956

OTHER REFERENCES

Arithmetric Operations in Digital Computing, by R. K. Richards, Van Nostrand Co., Inc., Princeton, N.J., 7th printing, copyright 1955, pp. 194–198, Fig. 7–3.